United States Patent
Berdahl

(10) Patent No.: US 10,131,838 B2
(45) Date of Patent: Nov. 20, 2018

(54) COMPOSITIONS FOR COOLING MATERIALS EXPOSED TO THE SUN

(71) Applicant: The Regents of the University of California, Oakland, CA (US)

(72) Inventor: Paul H. Berdahl, Walnut Creek, CA (US)

(73) Assignee: The Regents of the University of California, Oakland, CA (US)

(*) Notice: Subject to any disclaimer, the term of this patent is extended or adjusted under 35 U.S.C. 154(b) by 0 days.

(21) Appl. No.: 14/675,328

(22) Filed: Mar. 31, 2015

(65) Prior Publication Data

US 2015/0275077 A1 Oct. 1, 2015

Related U.S. Application Data

(60) Provisional application No. 61/973,118, filed on Mar. 31, 2014.

(51) Int. Cl.
*C09K 11/64* (2006.01)
*C09D 5/22* (2006.01)
(Continued)

(52) U.S. Cl.
CPC .............. *C09K 11/685* (2013.01); *C09D 5/22* (2013.01); *C09K 11/54* (2013.01); *C09K 11/562* (2013.01); *C09K 11/7704* (2013.01); *C09K 11/7706* (2013.01); *C09K 11/7772* (2013.01); *C09K 11/7774* (2013.01); *C09K 11/883* (2013.01)

(58) Field of Classification Search
CPC .............. C09K 11/0811; C09K 11/685; C09K 11/7756; C09K 11/7758; C09K 11/7706; C09K 11/7704; C09D 5/22
See application file for complete search history.

(56) References Cited

U.S. PATENT DOCUMENTS 3,105,954 A * 10/1963 Gill, Jr. ................... E01F 9/506
　　　　　　　　　　　　　　　　　　　　　　250/462.1
3,550,033 A * 12/1970 Mazelsky ............... C04B 35/44
　　　　　　　　　　　　　　　　　　　　　　252/301.4 R
(Continued)

FOREIGN PATENT DOCUMENTS

CA　　　　2309871　　* 12/2000
CN　　　103468044　　* 12/2013
(Continued)

OTHER PUBLICATIONS

Choi, "Ancient Egyptian Pigment's Future Now Even Brighter", Inside Science, Reliable new for an expanding universe, Mar. 11, 2013.*
(Continued)

*Primary Examiner* — C Melissa Koslow

(57) ABSTRACT

The present invention provides for a composition comprising a pigment, wherein the composition is suitable for coating a surface that is, or is expected to be, exposed to the sun. The pigment comprises particles that fluoresce in sunlight, thereby remaining cooler in the sun than coatings pigmented with non-fluorescent particles. The particles comprise solids that fluoresce or glow in the visible or near infrared (NIR) spectra, or that fluoresce when doped. Suitable dopants include, but are not limited to, ions of rare earths and transition metals.

14 Claims, 2 Drawing Sheets

(51) Int. Cl.
*C09D 5/32* (2006.01)
*C09K 11/68* (2006.01)
*C09K 11/77* (2006.01)
*C09K 11/54* (2006.01)
*C09K 11/88* (2006.01)
*C09K 11/56* (2006.01)

(56) References Cited

U.S. PATENT DOCUMENTS

| | | | |
|---|---|---|---|
| 5,766,324 | A | 6/1998 | Ikegaya et al. |
| 7,183,000 | B2* | 2/2007 | Hall ............... B05D 5/061 427/157 |
| 7,625,973 | B2 | 12/2009 | Ambrose et al. |
| 8,030,396 | B2 | 10/2011 | Ambrose et al. |
| 8,679,617 | B2 | 3/2014 | Eibon et al. |
| 8,822,025 | B2 | 9/2014 | Decker et al. |
| 9,267,052 | B1* | 2/2016 | Joecken ............ C09D 163/00 |
| 2004/0191540 | A1 | 9/2004 | Jakobi et al. |
| 2005/0035331 | A1* | 2/2005 | Sun ............... C09J 7/0296 252/301.5 |
| 2009/0098474 | A1 | 4/2009 | Kim et al. |
| 2009/0286014 | A1* | 11/2009 | Scherer ............ C09K 11/02 427/595 |
| 2010/0047620 | A1 | 2/2010 | Decker et al. |
| 2012/0064134 | A1* | 3/2012 | Bourke, Jr. ............ A61Q 17/04 424/401 |
| 2012/0308724 | A1 | 12/2012 | Hellring et al. |
| 2014/0041925 | A1* | 2/2014 | Davis ............... H01B 7/29 174/40 R |
| 2014/0072790 | A1 | 3/2014 | Salguero et al. |
| 2015/0218340 | A1 | 8/2015 | Reddy et al. |

FOREIGN PATENT DOCUMENTS

| | | | |
|---|---|---|---|
| DE | 19828129 | * | 12/1999 |
| EP | 0719654 | A1 | 7/1996 |
| WO | WO 2011/035292 | * | 3/2011 |
| WO | WO 2011/035294 | * | 3/2011 |
| WO | 2014033726 | A1 | 3/2014 |

OTHER PUBLICATIONS

Translation for CN 103468044, Dec. 25, 2013.*
Goodfellow Corporation Catalogue, Aug. 10, 2017, cover page and pp. 10 and 69.*
Translation of DE 19828129, Dec. 30, 1999.*
O'Leary et al, "Determination of Chromium in Ruby", Journal Mineralogical Society of America, vol. 16, No. 1, Jan. 1931, pp. 34-36.*
Bray et al., "Long Range Target Discrimination Using UV Fluorescence", Proc. of SPIE, pp. 1-12, Vo. 8037 (2011).
Zalich et al., "Fluorescent Pigments for High-Performance Cool Roofing", Presentation to United States Department of Energy (Apr. 22, 2014-Apr. 25, 2014).
Zalich et al., "Fluorescent Pigments for High-Performance Cool Roofing", Presentation to United States Department of Energy (Apr. 2015).

* cited by examiner

COMPOSITIONS FOR COOLING MATERIALS EXPOSED TO THE SUN

CROSS-REFERENCE TO RELATED APPLICATIONS

This application claims priority to U.S. Provisional Patent Application Ser. No. 61/973,118, filed on Mar. 31, 2014, which is hereby incorporated by reference.

STATEMENT OF GOVERNMENTAL SUPPORT

The invention was made with government support under Contract No. DE-AC02-05CH11231 awarded by the U.S. Department of Energy. The government has certain rights in the invention.

FIELD OF THE INVENTION

The present invention is in the field of cool building materials.

BACKGROUND OF THE INVENTION

Current work on cool materials (particularly for roofing) has focused on the basic idea to find various colored materials, such as coatings, tiles, roofing granules, etc., that stay cooler in the sun than conventional materials. White materials are usually best, but architects and building owners often prefer non-white and even dark materials. To date, this has been done by selecting pigments (colorants) that do not absorb the near-infrared (NIR) portion of sunlight. Reflection of the NIR can then either be accomplished by the pigment itself or by a white (or other NIR-reflecting) underlayer. Commercially available selective blacks include the mixed metal oxides such as x $Fe_2O_3$. (1-x) $Cr_2O_3$ (where x varies) and a perylene organic black. These materials absorb light across visible spectrum (400 to 700 nm), and do not absorb light in the near infrared (700 to ~2500 nm). Thus, these pigments can be used to fabricate cool black materials. Grouping the mere 5% of the solar spectrum in the UV with the visible 45%, one can say that the solar spectrum is about ½ UV/VIS and about ½ in the NIR. The visible reflectance of black is usually about 0.05. If the NIR reflectance can be very high, say 0.95, then the overall solar reflectance of a cool selective black can be up to, but not exceed, 0.50. In a similar manner, the reflectance of other specified dark colors is limited because absorption in the visible is required to formulate a dark color.

SUMMARY OF THE INVENTION

The present invention provides for a composition comprising a pigment, wherein the composition is suitable for coating a surface that is, or is expected to be, exposed to the sun. The pigment comprises particles that fluoresce in sunlight, thereby remaining cooler in the sun than coatings pigmented with non-fluorescent particles. The particles comprise solids that fluoresce in the visible or near infrared (NIR) spectra, or that fluoresce when doped. Suitable dopants include, but are not limited to, ions of rare earths and transition metals.

The present invention provides for a composition suitable for coating a surface that is, or is expected to be, exposed to the sun, comprising a metal oxide or fluoride, or metal compound, or a mixture thereof, that fluoresces and/or has a near infrared (NIR) reflectance, such as wavelength(s) within the 700 to 1,500 nm range, or fluoresces or glows in the near infrared or visible when excited by light, such as sunlight.

In some embodiments, the composition has a dark color. The metal oxide or fluoride, or metal compound, or a mixture thereof, is capable of fluorescing in the visible and/or near-infrared. In some embodiments, when a surface is coated with the composition, the surface has an effective solar reflectance (ESR) that is equal to or over 0.4, 0.5, 0.6, or 0.7.

The present invention provides for the use of fluorescent pigments to permit various colored materials to remain cooler in the sun than the conventional, non-fluorescent pigments currently in use for this purpose. One aspect of the invention is that the design of the coatings (and other materials) with specified color must be modified such that absorbed energy is not converted to heat, but re-radiated. In some embodiments, the conventional cool pigments are used sparingly.

BRIEF DESCRIPTION OF THE DRAWINGS

The foregoing aspects and others will be readily appreciated by the skilled artisan from the following description of illustrative embodiments when read in conjunction with the accompanying drawings.

DETAILED DESCRIPTION OF THE INVENTION

Figure 1:
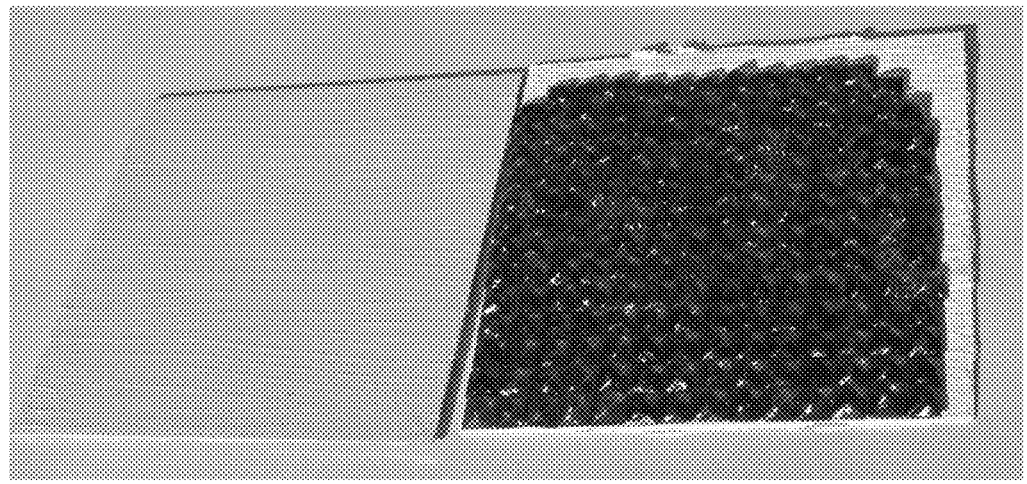
FIG. 1 shows a photo of the samples in sunlight, wherein on the left is the off-white reference, and on the right is the experimental sample which includes a layer of synthetic rubies.

Before the present invention is described, it is to be understood that this invention is not limited to particular embodiments described, as such may, of course, vary. It is also to be understood that the terminology used herein is for the purpose of describing particular embodiments only, and is not intended to be limiting, since the scope of the present invention will be limited only by the appended claims.

Where a range of values is provided, it is understood that each intervening value, to the tenth of the unit of the lower limit unless the context clearly dictates otherwise, between the upper and lower limits of that range is also specifically disclosed. Each smaller range between any stated value or intervening value in a stated range and any other stated or intervening value in that stated range is encompassed within the invention. The upper and lower limits of these smaller ranges may independently be included or excluded in the range, and each range where either, neither or both limits are included in the smaller ranges is also encompassed within the invention, subject to any specifically excluded limit in the stated range. Where the stated range includes one or both of the limits, ranges excluding either or both of those included limits are also included in the invention.

Unless defined otherwise, all technical and scientific terms used herein have the same meaning as commonly understood by one of ordinary skill in the art to which this invention belongs. Although any methods and materials similar or equivalent to those described herein can be used in the practice or testing of the present invention, the preferred methods and materials are now described. All publications mentioned herein are incorporated herein by reference to disclose and describe the methods and/or materials in connection with which the publications are cited.

The terms "optional" or "optionally" as used herein mean that the subsequently described feature or structure may or may not be present, or that the subsequently described event or circumstance may or may not occur, and that the description includes instances where a particular feature or structure is present and instances where the feature or structure is absent, or instances where the event or circumstance occurs and instances where it does not.

These and other objects, advantages, and features of the invention will become apparent to those persons skilled in the art upon reading the details of the invention as more fully described below.

The present invention provides for a composition suitable for coating a surface that is, or is expected to be, exposed to the sun, comprising a metal oxide or fluoride, or a mixture thereof, that fluoresces and/or has a near infrared (NIR) reflectance, such as wavelength(s) within the 700 to 1,500 nm range, or fluoresces or glows in the near infrared or visible when excited by light, such as sunlight. In some embodiments, the wavelength(s) are within the 700 to 1,000 nm range. In some embodiments, the composition has a dark color. The metal oxide or fluoride, or metal compound, or a mixture thereof, is capable of fluorescing in the visible and/or near-infrared. In some embodiments, when a surface is coated with the composition, the surface has an effective solar reflectance (ESR) that is equal to or over 0.4, 0.5, 0.6, or 0.7.

In some embodiments, the composition or metal oxide or fluoride, or metal compound, an achieve an ESR value that is equal to or over 0.4, 0.5, 0.6, or 0.7. In some embodiments, the composition or metal oxide or fluoride, or metal compound, can achieve an ESR value that ranges from about equal to or over 0.4 to equal or lower than 0.7. In some embodiments, the composition or metal oxide or fluoride, or metal compound, can achieve an ESR value that ranges from about equal to or over 0.5 to equal or lower than 0.7. In some embodiments, the composition or metal oxide or fluoride, or metal compound, can achieve an ESR value that ranges from about equal to or over 0.6 to equal or lower than 0.7.

In some embodiments, the composition is a liquid, a colloid, or a solution suitable for coating, or a coating on a surface that is, or is expected to be, exposed to the sun. In some embodiments, the composition is a solid.

Phosphors with a Transparent Matrix (Wide Band Gap Materials)

In some embodiments, the pigment comprises a transparent host material that is glassy, crystalline, polycrystalline, or nanocrystalline. If the host materials is visibly transparent, its band gap must be larger than 3.1 eV, so that intrinsic absorption occurs only at non-visible (e.g., UV) wavelengths. This material requires addition of dopant ions (and/or impurities, defects, etc.) so that it can absorb more sunlight than the minor 5% ultraviolet component, and may also require dopants so that the fluorescent emission is in the spectral range of interest.

Many phosphors for fluorescent lamps are known. They require strong UV absorption and, generally, strong visible emission. Recipes for synthesizing ~200 of these materials may be found in [Inorganic phosphors [electronic resource]: compositions, preparation and optical properties, William M Yen and Marvin J. Weber, eds., Willi Lehmann, additional author, Boca Raton: CRC Press (2004)]. Modification of these recipes can be performed by substitution of atoms by chemically similar atoms that are lower down in the periodic table. If the substitutions do not lead to different crystal structures, the corresponding band gaps are usually smaller, leading to more absorption in the 400 to 600 nm range. Also, visibly emitting dopants can be replaced by those with those emitting in the near infrared. For example, $Eu^{3+}$, used as a red emitter (~600 nm) can be replaced with $Cr^{3+}$, emitting in the 695 to 800 nm range.

Semiconductor Phosphors

In some embodiments, the pigment comprises semiconductors which have a direct band gap and are particularly useful for absorbing and emitting radiant energy. (The term direct gap means that the maximum in the valence band and the minimum in the conduction band reside at the same position in momentum space.) With a direct gap radiative recombination of electrons and holes can occur with a high probability as no phonons are necessary to provide conservation of momentum. Materials that are pure and defect free can efficiently emit light with photon energy equal to the band gap (plus the kinetic energy of an electron and hole, a few tens of electron millivolts). Thus, in some cases, semiconductor phosphors require no dopants. Materials that are doped or have native defects (e.g., lattice vacancies, interstitials, and the like) may have "shallow" levels that are inside the forbidden band gap but near to the valence or conduction bands. Thus the emitted photon energies can be smaller than the band gap. Further, as electrons and holes are usually delocalized inside semiconductor particles, quantum confinement by nanoparticles (sizes below about 100 nm) can lead to photon emission with energy above the band gap. Suitable semiconductors and their band gaps, include the following: Amorphous silicon. Crystalline silicon is an undesirable indirect gap material, but amorphous silicon has similarities to a direct gap material with absorption edge near 700 nm (~1.8 eV). (2) III-V compounds: Compounds of Al, Ga, In, with N, P, As, Sb, such as GaAs (1.4 eV), InP (1.3 eV), AlAs (2.1 eV), and InN (0.7 eV). Alloys such as (Ga,Al) As can be used as well. II-VI compounds: Compounds of Mg, Zn, Cd, with O, S, Se, Te such as CdS (2.5 eV), CdSe (1.7 eV), CdTe (1.5 eV) and their alloys. And other suitable ternary and quaternary compounds.

In some embodiments, the pigment is a metal oxide or metal fluoride, or metal compound, doped with one or more rare earth elements, such as Nd, Pm, Dy, Ho, Er, Tm, or Yb, or a transition metals, such as Cr. In some embodiments, the metal oxide is $YAlO_3$ doped with one or more rare earth element, such as Nd, Pm, Dy, Ho, Er, Tm, or Yb, or a transition metals, such as Cr. In some embodiments, the metal oxide is $Al_2O_3$. In some embodiments, the metal is a cadmium compound, such as CdS, CdSe, or CdTe. The dopant can be up to (except for "greater than 0%"), or at least, greater than 0%, 0.1%, 0.5%, 1%, 5%, 10%, 20%, 30%, 40%, or 50%, or any range between any two values thereof, by molar ratio, volume, or weight of the compound. A suitable dopant is $Cr_2O_3$.

Pigments suitable for the invention, that are known to fluoresce in the NIR, are Egyptian blue ($CaCuSi_4O_{10}$, at 910 nm), Han blue ($BaCuSi_4O_{10}$), Han purple ($BCuSi_2O_6$), lazurite ($Na_4SSi_3Al_3O_{12}$, at 830 nm), and the cadmium compounds Cd(S,Se,Te) (wavelength depends on S/Se/Te proportions). In some embodiments, the metal oxide or a first metal oxide, such as $Al_2O_3$, is doped with a second metal oxide of an amount ranging from greater than 0% to up to 50%. In some embodiments, the second metal oxide can be up to (except for "greater than 0%"), or at least, greater than 0%, 0.1%, 0.5%, 1%, 5%, 10%, 20%, 30%, 40%, or 50%, or any range between any two values thereof, by molar ratio, volume, or weight of the compound. In some embodiments, the dopant is $Cr_2O_3$. Certain oxides are commercially available from Goodfellow Corp. (Coraopolis, Pa.).

Other suitable pigments include materials that emit in the near infrared (700 to 1500 nm), such as (Zn, Cd) S:$Ag^+$, different compositions emit in a band located near 665 up to 725 nm; $Zn_3(PO_4)_3$:$Mn^{2+}$, 640 nm, really red rather than IR; $Al_2O_3$:$Cr^{3+}$, 694 nm (deep red); $Y_2O_3$:Eu, 620, 710 nm; $Y_2O_2S$:Eu 620, 710 nm; $LiAlO_2$:$Fe^{3+}$, 743 nm band; $InBO_2$:Cr, 800 nm; $YVO_4$:[V]:Nd, wherein [V] means vacancy, 860, 930 nm; YAG:Cr, wherein YAG means yttrium-aluminum-garnet, $Y_3Al_5O_{12}$:$Cr^{3+}$, 700 nm; $Y_3Ga_5O_{12}$:Cr, 700-800 nm; and, $Gd_3Ga_5O_{12}$:Cr, 700-780 nm. Suitable pigments are also taught in E. Sluzki, M. Lemoine, and K. Hesse, "Phosphor development for amorphous silicon liquid crystal light valve projection display, J. Electrochem. Soc. 141 (11), November 1994. Some specific examples taught by Yen and Webster are shown in Table 1.

TABLE 1

| Composition | Emission | Notes |
| --- | --- | --- |
| $Mg_2SiO_4$: $Mn^{2+}$ | red, 1.88 eV | $Mn^{2+}$ associated with deep red emission |
| $CaMgSi_2O_6$: $Eu^{2+}$, $Mn^{2+}$ | red, 1.8 eV | |
| $Ca_2MgSi_2O_7$: $Eu^{2+}$, $Mn^{2+}$ | deep red, 1.8 eV | Excitation via both UV and blue |
| $LaPO_4$: $Eu^{3+}$ | 1.78-2.12 eV | Several discrete lines |
| alpha-SrO•$3B_2O_3$: Sm | deep red 1.81 eV | Broad absorption 300-550 nm |
| $LiAlO_2$: $Fe^{3+}$ | deep red, 700-800 nm | requires dopant to enhance absorption |
| $SrMoO_4$: U | 650-700 nm | |
| $Mg_2TiO_4$: $Mn^{4+}$ | 650-700 nm | |
| ZnS: $Sn^{2+}$ | 640-760 nm | |
| Alloys of ZnS and CdS doped with $Ag^+$, $Cl^-$ | 700-800 nm | |
| CaS: $Yb^{2+}$ | 750 nm | Cl likely co-dopant |
| $CaGa_2S_4$: $Mn^{2+}$ | 710 nm | |

Other suitable rare earth dopants for near-infrared emission, and sensitizing ions, are taught herein. The sensitizing ions enhance absorption of excitation radiant energy and transfer energy to the radiating ions. Selected data from Table IV of G. C. Righini and M. Ferrari, Rivista del Nuovo Cimento, Vol 28, 1-53, (2005) are shown in Table 2.

TABLE 2

| Rare earth dopant ion | Emission wavelength(s), micrometers | Sensitizing ions |
| --- | --- | --- |
| $Pr^{3+}$ | 0.89, 1.04, 1.34 | |
| $Nd^{3+}$ | 0.93, 1.06, 1.35 | $Cr^{3+}$, $Mn^{2+}$, $Ce^{3+}$ |
| $Sm^{3+}$ | 0.65 | |
| $Ho^{3+}$ | 0.55, 1.38, 2.05 | |

TABLE 2-continued

| Rare earth dopant ion | Emission wavelength(s), micrometers | Sensitizing ions |
| --- | --- | --- |
| $Er^{3+}$ | 1.30, 1.54, 1.72, 2.75 | $Cr^{3+}$, $Yb^{3+}$ |
| $Tm^{3+}$ | 0.80, 1.47, 1.95, 2.25 | $Er^{3+}$, $Yb^{3+}$ |
| $Yb3^{3+}$ | 1.03 | $Nd^{3+}$ |

$Y_3Al_5O_{12}$:$Nd^{3+}$ is an important laser material that emits at 1060 nm. The $Nd^{3+}$ ion also emits at 1060 nm (a broader line) in a variety of glasses.

The present invention provides for composition comprising metal oxides or fluorides that fluoresce in the visible or near-infrared. In a particular embodiment, the metal oxide is ruby powder which can be used to fabricate a coating. The material is $Al_2O_3$ with 0.1% $Cr_2O_3$ and can is commercially available from Goodfellow Corp. (Coraopolis, Pa.).

In the present invention, the composition has some of the light energy that is absorbed re-radiated by fluorescence. Due to the so-called Stokes shift, re-radiated light usually has a longer wavelength. In some embodiments, the fluorescent energy appears in the NIR, in which has the advantage of not affecting the color within the visible spectrum, that is, to the human eye.

UV and VIS photons in the solar spectrum have an average energy corresponding to a wavelength of about 500 nm. The most energetic NIR photons have a wavelength of about 750 nm. If the quantum efficiency of the fluorescence process is about 1 (1 photon out for each photon absorbed), then the energy yield is about ⅔ (500/750) of the UV/VIS input energy (½ the total). Hence the energy limit for black cited above is increased from 0.50 by (0.95) (½) (⅔)=0.317, to about 0.82.

The present invention provides for the use of fluorescent pigments to permit various colored materials to remain cooler in the sun than the conventional, non-fluorescent pigments currently in use for this purpose. One aspect of the invention is that the design of the coatings (and other materials) with specified color must be modified such that absorbed energy is not converted to heat, but re-radiated. In some embodiments, the conventional cool pigments are used sparingly.

While pigments that fluoresce in the visible may be used, it is clear that materials fluorescing in the near-infrared, close to 700 nm, are desired. A large number of materials are known as phosphors, for example from applications to cathode ray television screens or as lamp phosphors. It can be appreciated, however, that phosphors that emit in the 700 to 1000 nm range of particular interest here have been less-studied since the emitted radiation is not visible. Research on materials used for solid state lasers has identified some materials that emit in the near infrared. Many of these are metal oxides such as $YAlO_3$ doped with certain rare earths such as Nd, Pm, Dy, Ho, Er, Tm, and Yb. Certain transition metals, such as Cr, are also of interest as dopants. Pigments suitable for the invention, that are known to fluoresce in the NIR, are Egyptian blue ($CaCuSi_4O_{10}$, at 910 nm), lazurite ($Na_4SSi_3Al_3O_{12}$, at 830 nm), and the cadmium compounds Cd(S,Se,Te) (wavelength depends on S/Se/Te proportions ratio).

In a particular embodiment, the metal oxide is ruby powder ($Al_2O_3$ doped with $Cr_2O_3$, such as 0.1% $Cr_2O_3$). The material can be fabricated into a simple film using a transparent binder with a resulting pink color. Spectrophotometer testing show the expected broadband absorption across the UV and VIS spectrum, and very low absorption in the NIR.

An increase in the doping to 3% $Cr_2O_3$ produces a darker red color. To further darken the color, the ruby powder can be prepared in the form of nanoparticles (size less than about 50 nm), which would reduce scattering. The emission wavelength is 694 nm (deep red), with a quantum efficiency of 0.7. In some embodiments, a coating with ruby pigment can also be darkened by using a polymer medium with higher refractive index, for example, by addition of $TiO_2$ nanoparticles to the polymer. Ruby emits with a spectrum ranging from 700 to 800 nm.

In some embodiments, the cool-color pigments are typically inorganic mixed metal oxides that strongly reflect in the NIR. For example, cool black pigments can be Cr—Fe—O. The solar reflectance of dark cool pigments range from ~0.2 for cool blacks to ~0.4 for greens/blues/reds, falling far short of our target at least 0.4 for fluorescent cool black and at least 0.6 for fluorescent cool dark red.

In some embodiments, the infrared fluorescent pigments for useful in building envelopes. Fluorescence in the visible spectrum is commonly used in existing applications, such as highway signs, where visibility is important.

Table 3 below illustrates the potential performance benefits in coatings of pigments proposed in this pigment compared to several industry standard pigments. Specifically, there is dramatically increased Effective Solar Reflectance (ESR) of the target dark red compared to a generic iron oxide red and the target dark color pigment compared to generic carbon black and mixed metal oxide "cool" black pigment. These are then compared to the performance of rutile $TiO_2$ white. The ESR is the ratio of outgoing reflected solar radiation to incoming radiation, adjusted to account for the extra energy radiated away due to fluorescence.

TABLE 3

Comparison of existing pigments with pigment target values for ESR

| | Visible Reflectance (550 nm) | Effective Solar Reflectance |
| --- | --- | --- |
| Fluorescent Dark Red | 0.10 | 0.60-0.65 |
| Fluorescent Dark Color | 0.10 | 0.40-0.50 |
| Rutile $TiO_2$ White | 0.80-0.90 | 0.70-0.85 |
| Generic Carbon Black | 0.05 | 0.05 |
| Generic Iron Oxide Red | 0.10 | 0.20 |
| Generic Mixed Metal Oxide "Cool" Black | 0.08 | 0.22 |

The state of the art in building envelopes requires consideration of a number of market segments. In general, the market is divided into sloped and low-sloped roofs. The current state-of-the-art for flat or low-sloped roofs is a white roof, which can have initial solar reflectance values on the order of 0.70-0.85. Once a white roof is soiled, the typical solar reflectance is between 0.55 and 0.65. In some embodiments of the present invention, the coatings have the aesthetics of dark colors with the performance of the white roofs that are acceptable for low-sloped roofs.

The current state-of-the-art for steep roofs is cool spectrally selective solutions for most applications. For light colors, the use of existing technology in NIR reflective coatings achieves a solar reflectance of 25% to 50% depending on the color. In some embodiments of the present invention, dark color pigments are provided that achieve ESR values meeting or exceeding the values for the state of the art in light colors.

Certain organic pigments have properties that would be attractive for steep roofs such as high hiding power (the amount of pigment required in a coating to achieve color strength) and low NIR absorptance. However organic pigments use is limited because they lack UV durability. By-and-large, organic pigments are seldom used for building materials exposed to the environment due to durability issues.

In some embodiments, the composition can coat metal objects, such as coiled metal products (i.e. metal roofs). The novel dark color pigments can convert a significant fraction of the absorbed visible spectrum energy into NIR fluorescence.

The present invention has a variety of uses. It can be used for roofing and siding materials for construction in warm and hot climates. Also, for many other situations where white is not a desired color and solar heating is undesired, such as for auto finishes, PVC piping, clothing, etc. Cool roofing materials have the advantage of generally providing for reduced air conditioning costs and improved comfort in warm and hot climates, lowered outside air temperatures (reducing smog), and a reduction in global warming.

The present invention can be made using techniques known to one skilled in the art. Most roofing and siding materials are routinely fabricated with colorants (pigments) to provide an attractive appearance. The use of fluorescent pigments is quite similar to the use of conventional pigments. Coating and materials design issues are durability, resistance to acids and bases, toxicity (in some cases), potential to react with $H_2O$, $CO_2$, $O_2$, etc. In some cases coatings on the pigment particles may be used to make the pigments more durable (e.g., slow down reactions with water vapor), or to protect polymeric materials from photo-induced damage (e.g., coatings on generic $TiO_2$ white pigment), or to avoid leaching of toxic chemicals (e.g., cadmium from CdS, CdSe. CdTe). Where fluorescent pigments are used with co-pigments, it is important to minimize absorption of photons that would otherwise excite the fluorescent pigments.

Most of the usual techniques for coloration of conventional roofing and siding materials can be used. These include pigmented silicate coatings used on roofing granules employed on asphalt shingles. Metal roofing uses pigments in polymeric coatings. For concrete and clay roofing tiles pigmented top coatings can be used or the pigment can be dispersed through the body of the tile. For roof coatings applied on site and single-ply membranes the pigment is dispersed in the top layer.

It is to be understood that, while the invention has been described in conjunction with the preferred specific embodiments thereof, the foregoing description is intended to illustrate and not limit the scope of the invention. Other aspects, advantages, and modifications within the scope of the invention will be apparent to those skilled in the art to which the invention pertains.

All patents, patent applications, and publications mentioned herein are hereby incorporated by reference in their entireties.

The invention having been described, the following examples are offered to illustrate the subject invention by way of illustration, not by way of limitation.

Example 1

Thermal Test of the Cool Fluorescent Pigment Concept in Sunlight

Substrates used are 3"×3" aluminum sheets.

TABLE 4

Measurements with the SS Reflectometer (manufactured by Devices & Service Corp.)

| SSR channel | Al substrate | Off-white reference | 3 coats white | Ruby layer on 3 coats white | Ruby layer over white overcoated with clear | Spectralon | Bare ruby layer on spectralon |
|---|---|---|---|---|---|---|---|
| 6.173 | .626 | .646 | .876 | .527 | .485 | | |
| 1.5E | .644 | .653 | .897 | .598 | .552 | | |
| L1 | .740 | .572 | .846 | .702 | .621 | .964 | .807 |
| L2 | .606 | .684 | .953 | .773 | .722 | .980 | .793 |
| L3 | .550 | .730 | .940 | .117 | .124 | .974 | .120 |
| L4 | .497 | .235 | .238 | .054 | .064 | .954 | .061 |

The off-white reference film is made by mixing about 1 part in 20 ivory black into white. The ruby layer over white is not as reflective as the (3 coats of) white, even in the infrared (L1) channel. The roughness of the ruby layer may be contributing to a measurement artifact. It is known that the SSR will read low if it is raised a bit from the surface. The same reduction in reflectance happens with a ruby layer on spectralon. Total internal reflection inside the ruby crystals may also contribute to reduced infrared reflectance.

The clear overcoat is used because it was thought it would reduce scattering. However the reflectance in the L3 and L4 channel is not reduced as desired. Thus, the clear coat may be a liability; however it does keep the rubies attached to the substrate. A clear coat may still be helpful if small ruby particles are used as pigment.

From the highlighted measurement the overall solar reflectance (excluding fluorescence) is roughly 0.485. This figure will be too high due to fluorescence in the red due to blue and green light. The lamp however is not an efficient emitter of blue and green light, so the error may not be large. Also, the instrument may read low due to sample roughness in the L1 and L2 channels. Overall, based on what is known about the non-fluorescent part of the solar reflectance is that it is roughly 0.5. This figure is in contrast with the overall effective solar reflectance as will be determined by the thermal measurement, which is about 0.706.

Thermal Determination of Effective Reflectance $R_{eff}$ in Sunlight, about 0.706.

The sample under test is the 3 inch square aluminum substrate with 3 coats of white paint, a layer of rubies [each with a square outline but otherwise cut as a gem, 5 mm on a side, with pyramidal shape about 3 mm high, #5 stones (expresses how dark red they are)] (commercially available from PehnecGems; Garden Grove, Calif.), and a visibly transparent top coat [Golden Soft Gel (Gloss)]. About ⅙ of the sample is not covered with rubies; this portion of the sample has a solar reflectance of 0.876. The off-white reference coating, also on a 3 inch square Al substrate, has a solar reflectance of 0.646.

A chaise lounge with fabric covered cushion is used as a support for the samples. The back is tilted so the samples faced directly into the mid-day sun. A light beige towel is placed under the samples. IR temperature measurements the day before the measurements reported here show that the towel temperature is 50 to 52° C. while the reference temp is 48 to 50° C. Previous measurements show that sample temperatures can be perturbed by the temperature of the surrounding surface, so an effort is made to use a light-colored surface.

Measurements are made near solar noon. A slight breeze is present. During the measurements the air temperature changes from 37 to 38° C., average value 37.5° C. The temperature rise of the off-white reference is 21.34° C. above air temp., as measured with a data logger by a thermistor underneath the sample. The test coupon is only 14.81° C. above air temp. Therefore, the test sample has a solar reflectance in excess of 0.646. Temperature measurements of the sample tops with an IR "gun" range from 1 to 3 degrees higher and would yield similar results to the forthcoming results, had they been used.

The radiative cooling effect is estimated at 0.9×70 W m$^{-2}$ (mid-latitude summer value). Solving for the effective solar absorption, one obtains 0.265. Also, the sum of the radiative and convection heat transfer coefficients is 13.6 W m$^{-2}$ K$^{-1}$ (a small value, which indicates low wind speed). Finally, correcting for the fact that ⅙ of the sample has a low absorption, one find $a_{eff}$=0.294 for the ruby-coated part of the sample. Thus the effective solar reflectance is $R_{eff}$=0.706.

While it is uncertain as to the non-fluorescent part of the solar reflectance it seems likely to be near 0.5. The measured value of 0.7 for the overall effective reflectance is quite improbable without a significant contribution from fluorescence. Only the visible portion of sunlight contributes to the fluorescence here, as the UV is absorbed by the clear overcoat. The visible portion is about 0.45 of the total. The fraction of loss due to the Stokes shift is about (550/700), the ratio of the center wavelength to emission wavelength. Further, the quantum efficiency of the fluorescence is believed to be about 0.7. The product of these three numbers is 0.25, so that the fluorescence might contribute as much as this to the effective solar reflectance.

Overall, the picture is consistent, and it is concluded that the use of ruby as a red pigment can lead to anomalously high solar reflectance, due to fluorescence near 700 nm (694 nm). There is also a complex addition emission spectrum extending from 700 to 800 nm. The human eye is not very sensitive at 700 nm, so for some applications the fluorescence is invisible. Prior architectural materials with reflectance as large as 0.7 are all white, off-white or bright yellow.

Example 2

Thermal Test of the Cool Fluorescent Pigment Concept in Sunlight

A crude coating is made using the proposed process that resulted in a pink pigment (1% Cr2O3 by weight in Al2O3, too light to be called red). The powder synthesis uses a combustion synthesis method very similar to that reported by Kingsley (1988) (recipe doubled, 10% extra urea used). While the coating is too viscous for standard application techniques, it is successfully applied to a substrate using rudimentary spreading with a spatula. Using 3.4 g of pigment and 5.4 g of Liquitex® Gloss Medium & Varnish (Colorart Americas, Inc., Piscataway, N.J.) (monopropylene glycol) for a 8 cm×8 cm square, the visible reflectance at 550 nm is 0.42, which corresponds to an L* of 65. The effective solar reflectance is 0.81.

Figure 2:
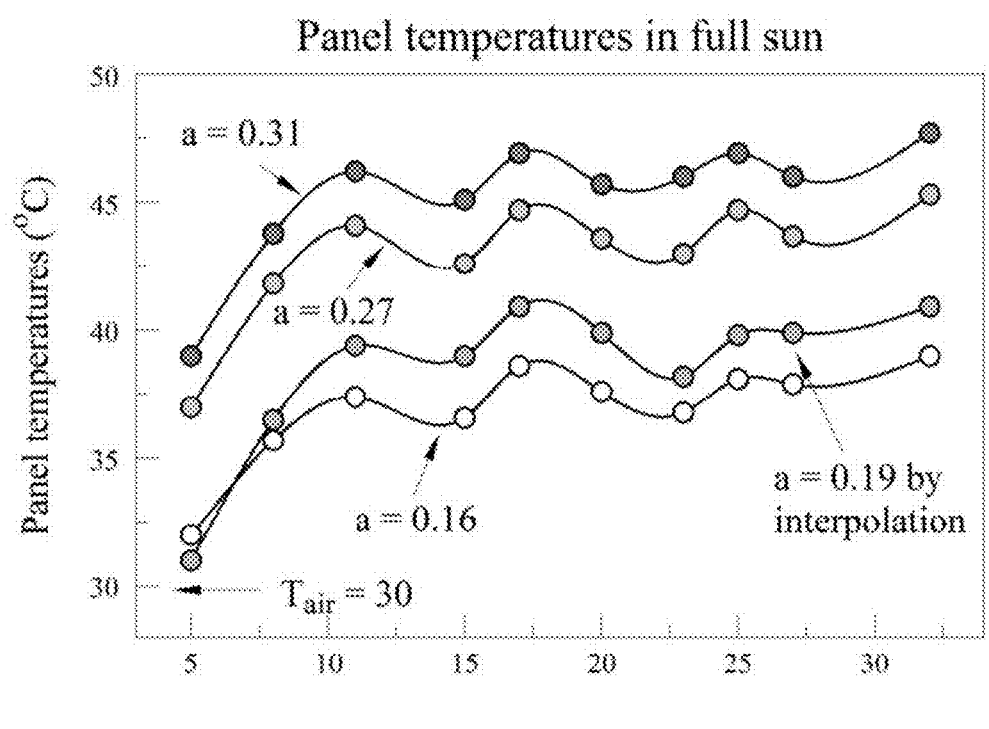
FIG. 2 shows a graph where the line labeled "a=0.19 by interpolation" shows the temperature of the sample under test as it warms in the sun, wherein three calibrated non-fluorescent samples are labeled with their spectrometer-determined solar absorptance values, and temperature fluctuations are caused by light gusts of wind.

FIG. 2 shows results from preliminary tests of the sample described above, three samples are identified by their solar absorptance, a as measured with a spectrometer, whereas the data points of the line labeled "a=0.19 by interpolation" represent the sample under test. Temperature fluctuations are caused by gusts of wind, but each sample tracks the others. Interpolation indicates that the fluorescent pigment has an effective solar absorptance of 0.19, equivalent to an effective solar reflectance of 0.81.

Figure 3:
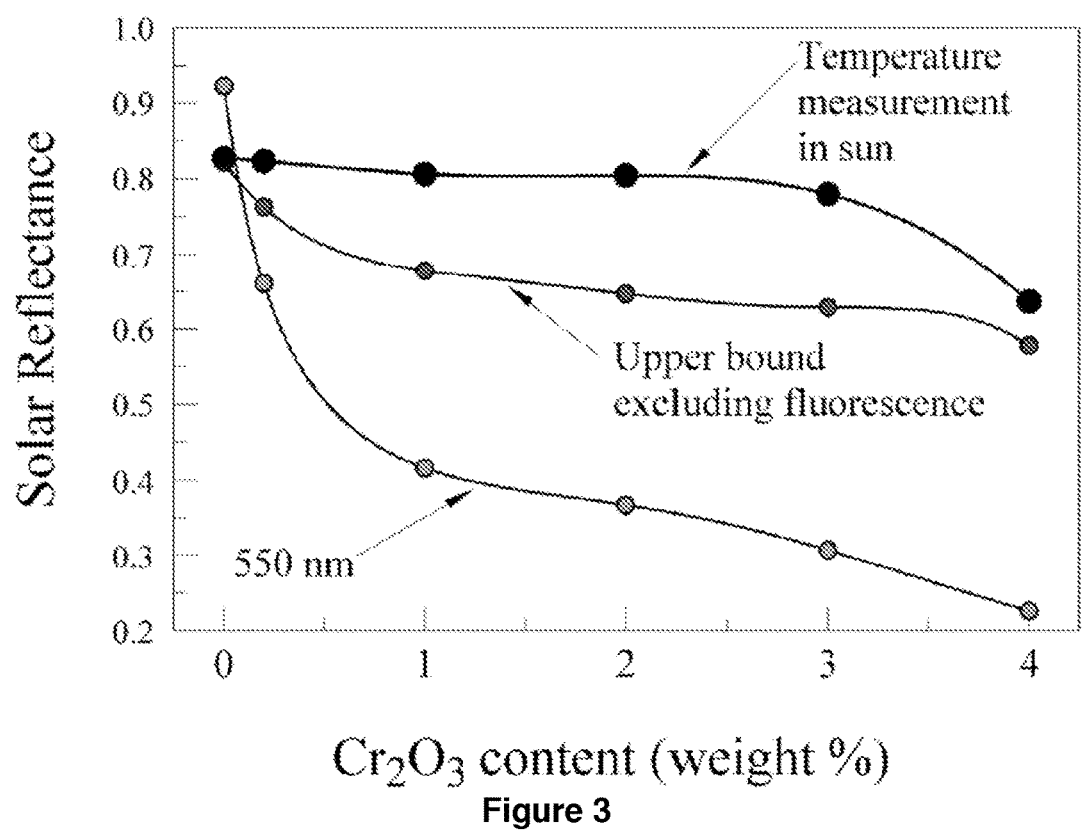
FIG. 3 shows SR verses concentration of $Cr_2O_3$, wherein the top curve is the effective SR as determined by temperature measurements in the sun, the middle curve is the standard spectrometer-determined solar reflectance without regard to fluorescence (it would be identical to the top curve if no fluorescence were present), and the bottom curve is the reflectance at 550 nm, which is a measure of visual brightness.

Further results are shown in FIG. 3. The weight percent of $Cr_2O_3$ dopant in the $Al_2O_3$ host lattice is 0%, 0.2%, 1%, 2%, 3%, and 4%.

While the present invention has been described with reference to the specific embodiments thereof, it should be understood by those skilled in the art that various changes may be made and equivalents may be substituted without departing from the true spirit and scope of the invention. In addition, many modifications may be made to adapt a particular situation, material, composition of matter, process, process step or steps, to the objective, spirit and scope of the present invention. All such modifications are intended to be within the scope of the claims appended hereto.

What is claimed is:

1. A coating composition comprising:
a transparent binder; and
a pigment comprising $Al_2O_3$ doped with $Cr_2O_3$,
wherein the weight percent of $Cr_2O_3$ dopant ranges from 0.5 to 4% of the total weight of the pigment.

2. The coating composition of claim 1, wherein the weight percent of $Cr_2O_3$ dopant ranges from 1 to 4% of the total weight of the pigment.

3. The coating composition of claim 1, wherein the coating composition exhibits a dark color.

4. The coating composition of claim 3, wherein the dark color is black, red, blue, and/or green.

5. The coating composition of claim 1, wherein the pigment fluoresces within the 700 to 1,000 nm range.

6. The coating composition of claim 1, further comprising a metal oxide or metal fluoride, or metal compound doped with one or more rare earth elements or a transition metal.

7. The coating composition of claim 6, wherein the metal oxide or metal fluoride, or metal compound, is doped with Nd, Pm, Dy, Ho, Er, Tm, Yb, or Cr.

8. The coating composition of claim 6, wherein the metal oxide is $YAlO_3$ doped with one or more rare earth elements or a transition metal.

9. The coating composition of claim 8, wherein the metal oxide is $YAlO_3$ doped with Nd, Pm, Dy, Ho, Er, Tm, Yb, or Cr.

10. The coating composition of claim 6, wherein the metal compound is a cadmium compound.

11. The coating composition of claim 10, wherein the cadmium compound is CdS, CdSe, or CdTe.

12. The coating composition of claim 1, wherein the coating composition is suitable for application over a surface of a roofing or siding material or an automotive finish.

13. A substrate exposed to or expected to be exposed to the sun coated with a coating composition including the coating composition of claim 1.

14. The substrate of claim 13, wherein the substrate is a roofing or siding material or an automotive finish.

* * * * *